G. W. TROUTMAN.
ADJUSTABLE VALVE SEAT DRESSING DEVICE.
APPLICATION FILED AUG. 16, 1913.
1,088,945.
Patented Mar. 3, 1914.
2 SHEETS—SHEET 1.
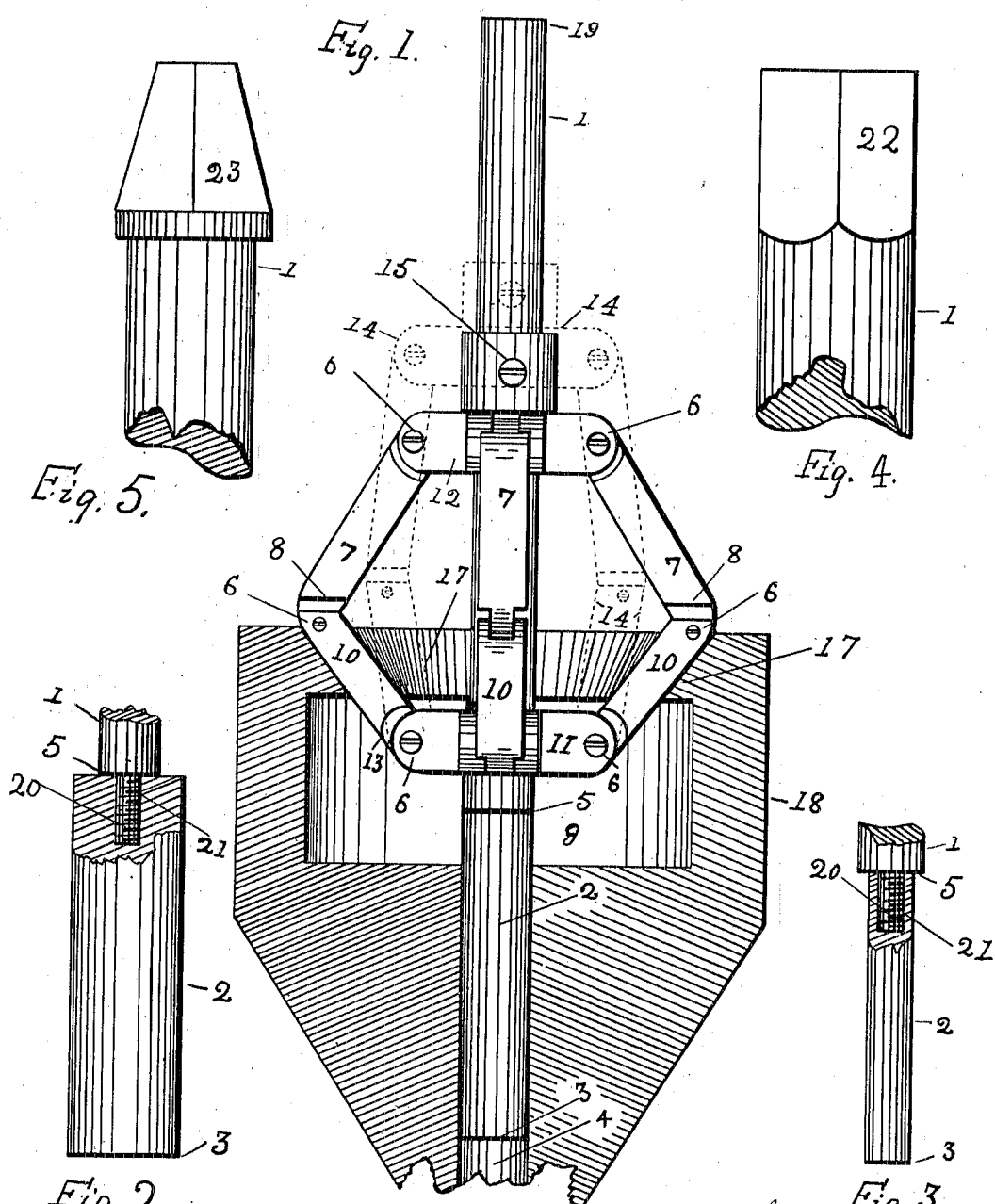

G. W. TROUTMAN.
ADJUSTABLE VALVE SEAT DRESSING DEVICE.
APPLICATION FILED AUG. 16, 1913.
1,088,945.
Patented Mar. 3, 1914.
2 SHEETS—SHEET 2.
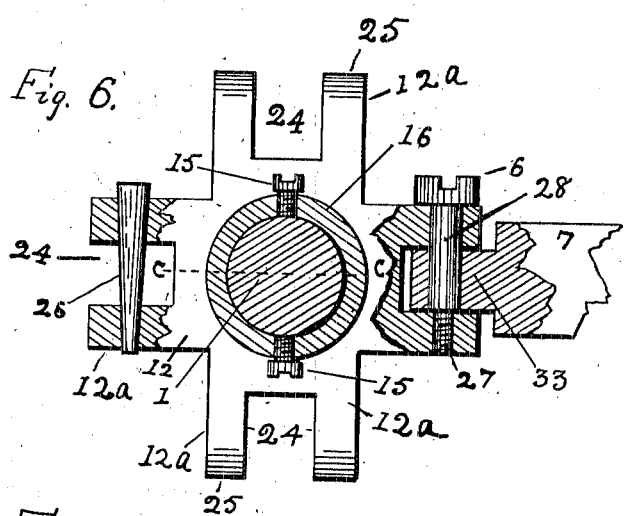
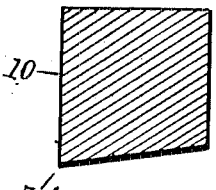
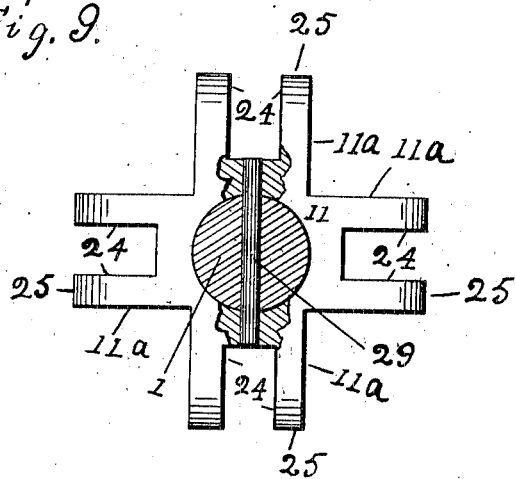
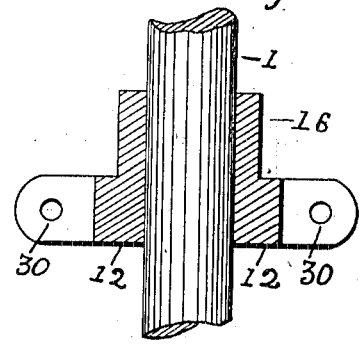
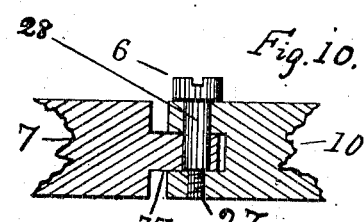
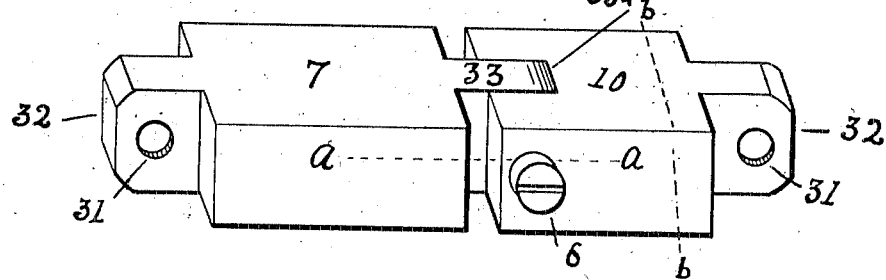
WITNESSES:
G. W. Troutman
INVENTOR.

UNITED STATES PATENT OFFICE.

GEORGE W. TROUTMAN, OF CALDWELL, KANSAS.

ADJUSTABLE VALVE-SEAT-DRESSING DEVICE.

1,088,945.  Specification of Letters Patent.  Patented Mar. 3, 1914.

Application filed August 16, 1913. Serial No. 785,061.

*To all whom it may concern:*

Be it known that I, GEORGE W. TROUTMAN, a citizen of the United States, residing at Caldwell, in the county of Sumner and State of Kansas, have invented a new and useful Adjustable Valve-Seat-Dressing Device, of which the following is a specification.

My invention relates to distinct improvements in adjustable valve seat dressing devices, having a plurality of cutting or dressing members, having a connecting mechanism which adapts the cutting members to readily being adjusted at any angle or desired size, so as to adapt the device to surfacing or reseating valve seats of various sizes and to the surfacing of valve seats generally.

In the various types of internal combustion engines and in automobile engines especially the valve seats are generally conical in shape and are formed in many instances in the main valve casing, or the valve casing where it is removable is often deep seated and difficult to get at and my device is particularly valuable because it is adapted to reface the valve seats without removing the valve casings from the parts to which they are connected and the device is of such size and shape as to easily enter the valve casing or chamber for the purpose of dressing the valve seat.

In use valves of all types frequently become injured by foreign substances being pressed against the valve seat by the action of the valve, and in many instances the valve seat becomes pitted and corroded by both chemical and mechanical action, and in the construction of the leading types of valves and especially those used in automobile engines the valve can usually be easily removed when it becomes deeply pitted and chucked in a lathe and properly refaced, but in many instances it is almost impossible and very expensive to reface the valve seat in a lathe, and in many instances after removing the valve and refacing it in a lathe the valve seat is so deeply pitted that it cannot be successfully ground to a perfect working surface, but with my device the valve seat can be quickly and smoothly resurfaced at any desired angle to fit the valve.

In automobile and other types of internal combustion engines the valves are usually provided with stems which vary in size and length on different makes and sizes of engines. These valve stems fit in perforations in the valve bodies or casings and act as guides for the valves to work in and keep them in alinement with their seats and one of the particular objects of my invention is to provide the device with an assortment of different sizes of interchangeable supplemental axial shafts which can readily be adapted to take the place of the various size valve stems and to fit in the valve stem perforations so as to act as a guide and axial bearing to keep the device in perfect alinement with the valve seat, these supplemental shafts are provided with means to rigidly secure them to the lower portion of the main axial shaft and in perfect alinement with it, and are readily detachable from the main axial shaft.

Another object is to provide the main axial shaft with two members which act as a connecting mechanism to connect the cutting members to, one of said members being slidable on the main axial shaft so that the cutting members can be adjusted transversely to the main axial shaft to any desired size or angle, also to provide the movable member with means to rigidly secure it to the main axial shaft in any desired position.

I attain these and other objects which will appear later by the mechanism illustrated in the accompanying drawings, in which—

Figure 1, is a vertical elevation partly in section of the device and shows it adapted to refacing the valve seat of an internal combustion engine. Fig. 2, is an elevation partly in section showing the supplemental axial shaft of greater diameter than the main axial shaft so as to adapt the device to fit the valve stem perforation in the valve casing where the valve stem is larger than the main axial shaft, it also shows means of connecting the supplemental shaft to the main axial shaft. Fig. 3, is an elevation partly in section showing the supplemental shaft of less diameter than the main axial shaft so as to adapt the device to fit the valve stem perforation in the valve casing where the valve stem is smaller than the main axial shaft and shows the means of connecting the two shafts together. Fig. 4, is an elevation of the top portion of the main axial shaft and shows the top part squared so as to adapt it to any drill chuck, bit stock or other device adapted to receive a squared shaft for the purpose of imparting rotary motion to it. Fig. 5, is an elevation of the top portion of the main axial shaft and shows an angular head formed thereon which is adapted to be engaged by any ordinary bit stock or drill chuck for rotating the device. Fig. 6, is a top plan view partly in section of the movable member to which the upper ends of the cutting members are connected. Fig. 7, is a cross section through one of the cutting members on the dotted line b—b. Fig. 8, is a vertical section through Fig. 6, on the dotted line c—c, and shows the shaft in elevation. Fig. 9, is a top plan view partly in section of the stationary member to which the lower ends of the cutting members are connected. Fig. 10, is a cross section through Fig. 11, on the dotted line a—a. Fig. 11, is a detailed view in perspective of the cutting members and the means of connecting them together.

Similar characters of reference refer to similar parts throughout the several views.

The main axial shaft 1, to which the supplemental axial shaft 2, is rigidly connected at 5, by means of the reduced threaded portion 20, on the lower part of the main axial shaft 1, the threaded portion 20 being adapted to screw into the threaded perforation 21, in the upper portion of the supplemental axial shaft 2, so as to connect the two shafts perfectly rigid.

In the construction of the supplemental axial shafts of the various sizes and lengths so that they may fit the valve stem perforations 4, in the valve stem casing 18, which receives the valve stem and acts as its guide the threaded perforations 21, are made to fit and rigidly screw onto the reduced threaded portion 20, and by this means the supplemental axial shaft 2, can always be selected of such size as to just fit the valve stem perforation 4, and the supplemental axial shaft 2, is thereby rotatable in an accurate manner in the valve perforation 4, which acts as a guide to keep the entire device in perfect alinement with the valve seat.

Rigidly secured to the lower portion of the main axial shaft 1, is the stationary member 11, which has its center perforated to receive the main axial shaft 1, and extending radially outward are the projections 11$^a$, which have the rectangular shaped perforations 24, formed in them to receive the reduced ends 32, of the cutting members 10. The reduced ends 32, have in them the perforations 31, through which pass the pivotal screws 6, or their equivalent. The pivotal screws 6, have the enlarged cylindrical portion 28, which acts as a pivot to secure the cutting members 10, to the stationary member 11, the radial projections 11$^a$ which form the rectangular perforations 24 are perforated in a manner similar to the perforations 30, shown in Fig. 8, to receive the pivotal screws 6, which are threaded at their small ends 27, and are adapted to screw into the threaded perforations in the radial projections 11$^a$, the outward ends of the radial projections 11$^a$, are preferably rounded as shown at 25.

The upper cutting members 7, have one of their ends reduced as at 33, which are adapted to pivotally work on the screws 6, within the rectangular perforations 33$^a$, in one of ends of the cutting members 10, the stationary member 11, is preferably rigidly secured to the main axial shaft 1, by the pin 29, or its equivalent or it may be rigidly secured to the main axial shaft by means of properly disposed set screws, or by any other suitable means desired.

The movable member 12, has its center perforated to receive the shaft 1, so that it is adapted to move upward and downward thereon, the upper portion of the member 12, is composed of an annular collar 16, which may have a plurality of threaded perforations to receive the set screws 15, said set screws being adapted to locking the movable member 12, to the shaft 1, in any desired position, the lower portion of the movable member 12 has the outward extending radial projections 12$^a$, which have the rectangular shaped perforations 24, formed in them. The radial projections 12$^a$, have the perforations 30, one of the sides of which is threaded to receive the pivotal screws 6, by which the reduced ends 32, of the upper cutting members 7, are secured to the member 12, by inserting the reduced ends 32, into the rectangular shaped perforations 24, and passing the pivotal screws 6, through the perforations 30 and 31. While I prefer to use the pivotal screws 6 to connect the cutting members 7 and 10 to the members 11 and 12 other means may be used such as a pin as shown at 26, or rivets which form a pivot may be used but I prefer the pivotal screws 6 as they permit the members to be easily taken apart for sharpening or repair purposes. The cutting members 10, preferably have their lower surfaces slightly angular to form a sharp cutting edge as shown by 34, in Fig. 7.

19—22 and 23 shows a plurality of means for imparting a rotary motion to the device. 19 shows the main axial shaft —1— at its upper portion of the same form and size as the entire shaft, any bit stock, hand drill or machine drill having a chuck adapted to receive and hold an axial shaft may be attached to the main axial shaft —1— at 19 and a rotary motion imparted to the device for facing or refacing the valve seat, or it may be chucked in a lathe and used in that manner. 22 shows the extreme upper portion of the main axial shaft squared so that where it is desired to use it in connection with a bit stock, hand drill or chuck adapted to receive a squared shaft it can be operatively secured therein and a rotary motion imparted to the device. 23 shows an angular head formed on the upper portion of the main axial shaft which is adapted to being engaged by any ordinary drill chuck for rotating the device.

The reduced portions 32 and 33 of the cutting members 7 and 10 may have their edges which are left by their reduction square as shown at 8, or they may be rounded as shown at 13.

The dotted lines 14 indicate the movement of the cutting members and their mechanism and show that the device can be successfully adapted to any size or shape of conical valve seat, the valve seat being indicated by 17 and the valve chamber by 9.

In operation the valve is removed from the casing and a supplemental shaft is selected of the proper size to fit the valve stem perforation, the supplemental shaft 2, is inserted in the valve stem perforation 4, and the movable member 12 is adjusted upward and downward until the cutting members 10, are perfectly adapted to facing the valve seat 17 at the proper angle the member 12 is locked in the proper position by the set screw 15 and a bit stock or drill having a chuck adapted to receiving shaft 1, is connected to it and the device is rotated under pressure until the cutting members have produced a perfect seat in the valve.

While I have illustrated and described a preferred embodiment of the invention I wish it understood that many modifications can be made in the device without departing from the scope of the invention as expressed in the claims, and What I do claim is:—

1. In an invention of the character described a valve seat dressing device, comprising a main axial shaft means on the lower portion of said shaft for rigidly attaching thereto a supplemental shaft in axial alinement therewith, a member slidable on the upper portion of the main axial shaft, said slidable member having a central perforation adapted to receive the main axial shaft, means for securing said slidable member to the shaft in a given position, means on the slidable member to pivotally connect the upper ends of the cutting members, cutting members adapted to dressing a valve seat, and means for imparting a rotary motion to the device.

2. In an invention of the character described a valve seat dressing device, comprising a main axial shaft means on the lower portion of said shaft for rigidly attaching thereto a supplemental shaft in axial alinement therewith, a member slidable on the upper portion of the main axial shaft, said slidable member having a central perforation adapted to receive the main axial shaft, means for securing said slidable member to the shaft in a given position, means on the slidable member to pivotally connect the upper ends of the cutting members, cutting members adapted to dressing a valve seat, a stationary member rigidly secured to the lower portion of the main axial shaft said member having a central perforation adapted to receive the shaft, means on said stationary member to pivotally connect the lower ends of the cutting members, and means for imparting a rotary motion to the device.

3. In an invention of the character described a valve seat dressing device, comprising a main axial shaft and a supplemental shaft rigidly connected to the lower portion of the main shaft in axial alinement therewith, a stationary member rigidly secured to the lower portion of the main axial shaft, said stationary member having a central perforation adapted to receive the main axial shaft, means on said stationary member to pivotally connect the lower ends of the cutting members, cutting members adapted to dressing a valve seat, a member slidable on the upper portion of the main axial shaft and adapted to pivotally connect the upper ends of said cutting members, said movable member being adapted to slide upward and downward on the main axial shaft and having means for rigidly securing it to the shaft in a given position so as to adapt the cutting members to a desired size and angle and means for imparting a rotary motion to the device.

4. In an invention of the character described a valve seat dressing device, comprising a main axial shaft and a supplemental shaft rigidly connected to the main shaft in axial alinement therewith, a member slidable on the main shaft, means for rigidly securing said slidable member in a given position, said slidable member having a central perforation adapted to receive the main axial shaft, means on the slidable member to pivotally connect the upper ends of the cutting members, cutting members adapted to dressing a valve seat and means for imparting a rotary motion to the device.

In testimony whereof, I have signed this specification in the presence of two subscribing witnesses.

G. W. TROUTMAN.

Witnesses:
MINNIE SWARTZEL,
G. H. RHOADES